April 22, 1952 L. E. HELDENBRAND 2,593,559
ANIMAL RESTRAINING DEVICE
Filed Sept. 19, 1947 4 Sheets-Sheet 1
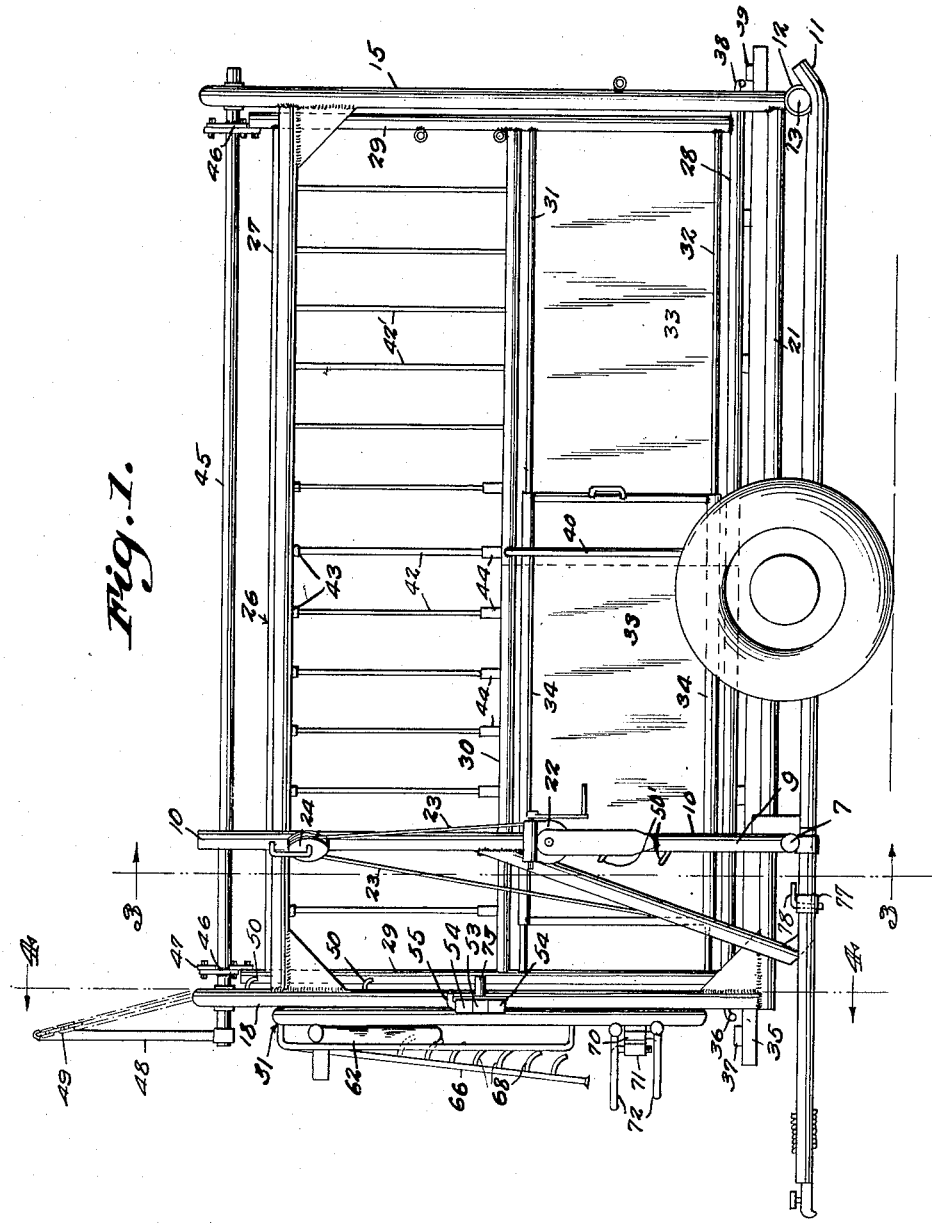
L.E.Heldenbrand
INVENTOR
BY
ATTORNEYS

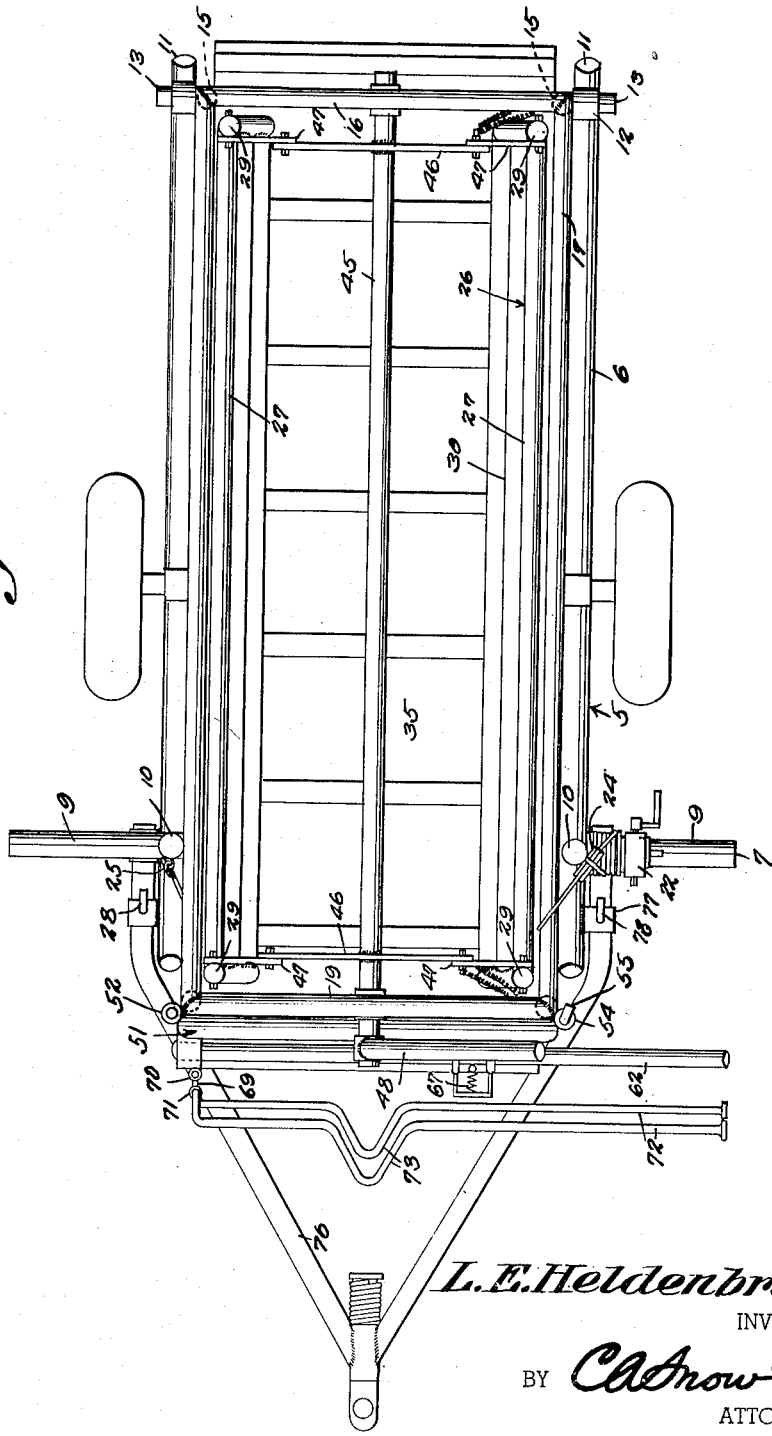

April 22, 1952 L. E. HELDENBRAND 2,593,559
ANIMAL RESTRAINING DEVICE
Filed Sept. 19, 1947 4 Sheets-Sheet 3
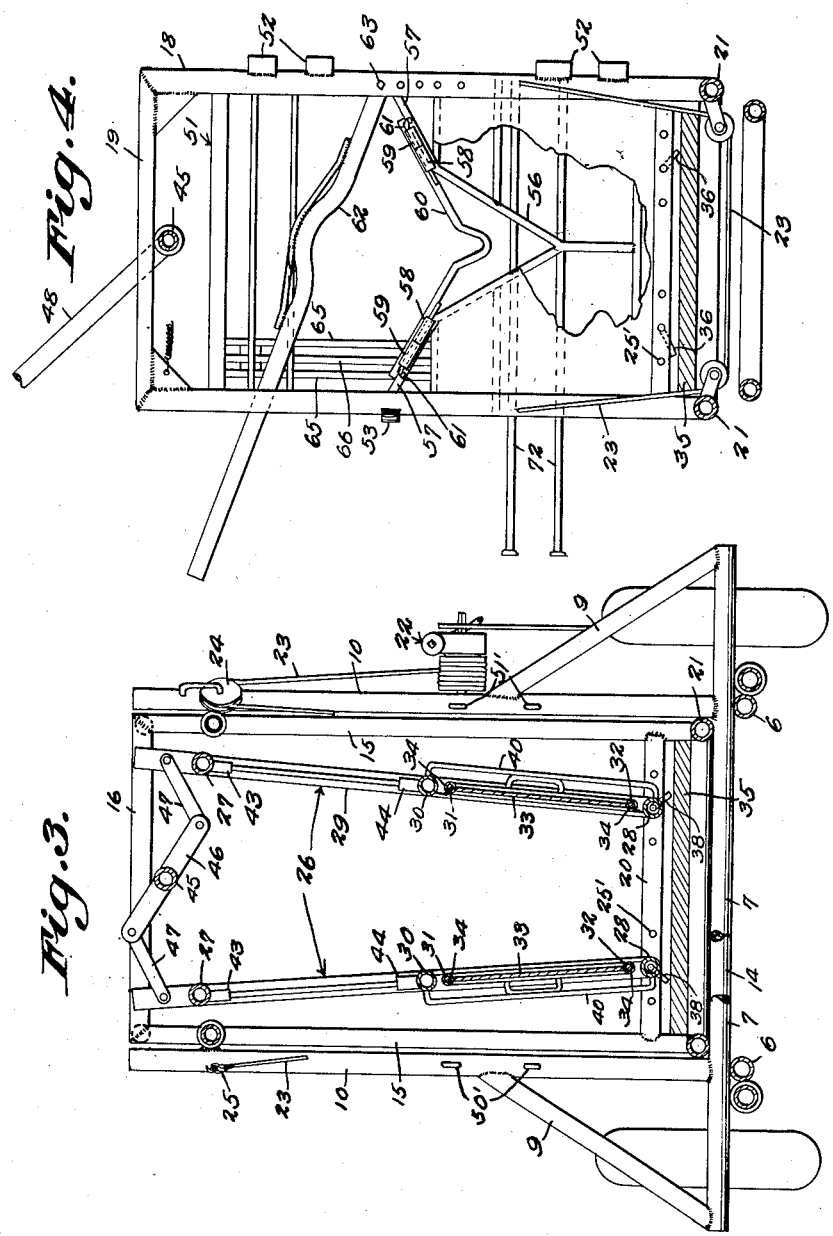
L. E. Heldenbrand
INVENTOR
BY
ATTORNEYS.

April 22, 1952 L. E. HELDENBRAND 2,593,559
ANIMAL RESTRAINING DEVICE
Filed Sept. 19, 1947 4 Sheets-Sheet 4
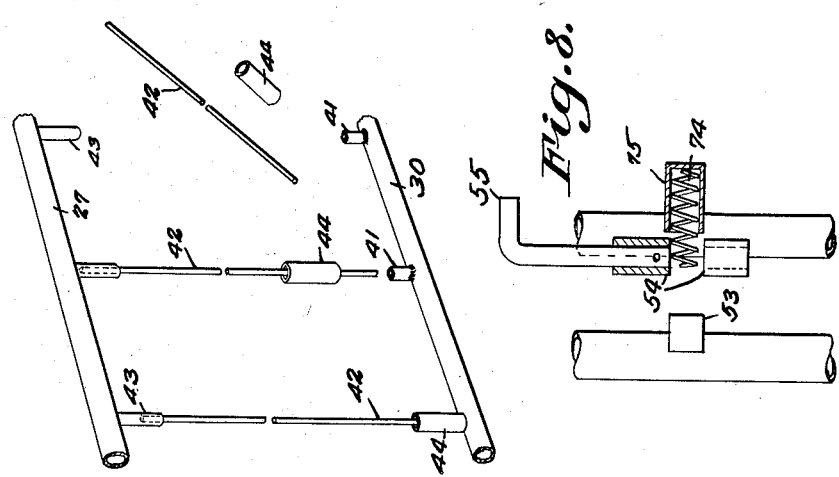
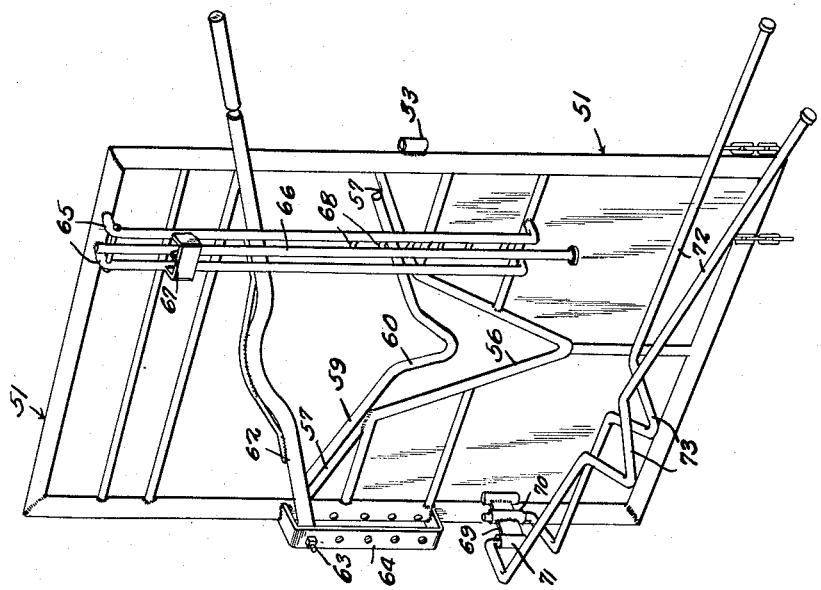
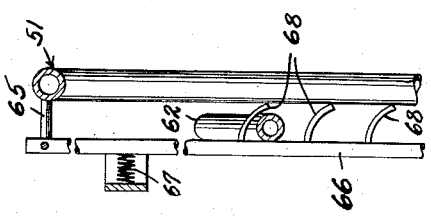
L.E.Heldenbrand
INVENTOR
BY
ATTORNEYS.

Patented Apr. 22, 1952

2,593,559

UNITED STATES PATENT OFFICE 2,593,559

ANIMAL RESTRAINING DEVICE

Laurance E. Heldenbrand, Oklahoma City, Okla.

Application September 19, 1947, Serial No. 775,049

2 Claims. (Cl. 119—99)

This invention relates to a combination stock chute and stock-restraining device, designed for use in restraining animals while they are being dehorned or treated for various diseases such as the hoof and mouth disease, or any treatment wherein it is necessary to prevent movement of the animals during the treatment.

Another object of the invention is to provide a restraining device including adjustable laterally swinging sections cooperating in clamping the sides of an animal to prevent movement of the animal while undergoing treatment.

Another object of the invention is to provide adjustable head and nose clamping means for clamping the heads and noses of animals of various sizes.

Still another object of the invention is to provide an inner section wherein the gate at one end thereof may be removed and the gate end elevated to the desired level, providing a loading chute for directing animals into box cars, trucks or the like for shipment.

A further object of the invention is to provide an inner section having adjustable side members which may be moved to expose the feet and sides of an animal held therein, to permit treatment of the animal with facility.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Figure 1 is a side elevational view of a combined loading chute and restraining device, constructed in accordance with the invention.

Figure 2 is a plan view thereof.

Figure 3 is a sectional view taken on line 3—3 of Figure 1.

Figure 4 is a sectional view taken on line 4—4 of Figure 1.

Figure 5 is an enlarged fragmental detail view illustrating the means for securing the head clamping lever of the restraining device, in its adjusted positions.

Figure 6 is a perspective view illustrating the removable front end member of the device.

Figure 7 is an enlarged detail view illustrating removable rungs forming a part of the inner section.

Figure 8 is a fragmental enlarged view illustrating the means for securing the removable end gate to the inner section.

Referring to the drawings in detail, the combined stock chute and stock-restraining device, comprises the main wheel-supported frame indicated generally by the reference character 5, the main frame embodying spaced tubular side members 6 connected at their forward ends by means of the transverse tubular member 7, the member 7 being of a length so that its ends extend appreciable distances beyond the side members 6, as clearly shown by Figure 3 of the drawings.

The rear ends of the members 6 are connected by means of the tubular member 14, the members 7 and 14 being preferably welded to the upper surfaces of the side members 6.

Brace tubes 9 connect the outer ends of the member 7, with the front upright tubes 10 which have their ends welded to the members 7 and 10.

The rear ends of the members 6 are curved slightly upwardly at 11, and at this point, circular bearings 12 are welded, in which bearings the pintles 13 of the movable section of the device, are mounted. The pintles 13 are formed at the rear end of the movable frame and constitute extensions at the ends of the rear tubular member 14 of the movable frame.

Rising from the tubular member 14 at points adjacent to the ends thereof, are the rear end tubular uprights 15 which have their upper ends connected by means of the transverse tubular member 16 to the ends of which are welded the rear ends of the spaced upper tubular members 17, the forward ends of which connect with the upper ends of the tubular uprights 18 disposed at the front of the movable frame. The upper ends of the tubular uprights 18 are connected by means of the transverse tubular member 19, while the lower ends of the tubular uprights 18 are connected with the lower transverse tube 20, the tubes 20 and 14 being connected with the lower spaced longitudinal tubes 21 that constitute the side tubes of the movable frame.

Thus, it will be seen that due to this construction, I have provided a combined restraining device and loading chute including an outer stationary frame, and an inner movable frame open at their rear ends to permit cattle to be driven into the device. Supported on one of the upright tubes 10 of the main frame of the device, is a windlass 22 over which the cable operates, the cable 23 also operating over the pulley 24 mounted adjacent to the upper end of the upright 10, from where the cable moves downwardly and passes under the movable frame, where it connects with the tubular upright at the opposite side of the movable frame, as at 25, the intermediate portion of the cable operating over pulleys secured to the bottom of the movable frame. Thus, it will be obvious that by rotating the windlass and winding the cable thereon, the forward end of the movable frame will be elevated, should it be desired to use the device in an inclined position for loading cattle to an elevated carrier.

As clearly shown by Figure 3 of the drawings, the lower transverse tube 20 and forward tube of the movable frame, are formed with openings 25' in which the pivot pins 36 and 38 of the pivoted animal clamping members 26 are mounted, the clamping members 26 comprising rectangular frames 27 that extend longitudinally of the movable frame. Each of these clamping members 26 embodies upper and lower longitudinal tubes 27 and 28 respectively which are connected at their ends, to the vertical tubes 29, the upper ends of the vertical tubes 29 extending an appreciable distance above the tubes 27, as illustrated by Figure 3 of the drawings.

Disposed between the tubes 27 and 28 of each clamping member, is an intermediate horizontal tube 30, and directly under the tubes 30 are rods 31 that lie in parallel relation with the tubes 30. Directly above the lower tubes 28, are rods 32 which are disposed in parallel relation with the rods 31. The rods 31 and 32 provide bearings for the side plates 33 which are constructed preferably of metal and formed with tubes 34 along the upper and lower edges thereof, the tubes accommodating the rods 31 and 32, so that the side plates may be readily slid to either close the sides of the clamping members, or open the sides of the clamping members to permit the operation or treatment of the feet of the animal standing between the clamping members, on the flooring 35 which rests on the horizontal end tubes of the movable frames. Locking pins 36 extend forwardly from the front end of the movable section, and are designed to contact with a cleat 37 extended across the floor 35, at a point adjacent to the forward end thereof, thereby holding the floor against displacement, in one direction. At the opposite end of the movable frame, are pins 38 that engage the cleat 39 at the opposite end of the floor, to prevent movement of the floor in this direction, or in a direction towards the rear of the frame. Due to this construction, the pins 36 and 38 may be readily pivoted to disengage the flooring cleats when it is desired to slide the flooring from its position for cleaning purposes.

The horizontal intermediate tubes 30 of the animal clamping members 26, are secured in spaced relation with respect to the lower tubes 28, by means of the rods 40 that are shown as having their ends extended inwardly and welded to the tubes 28 and 30.

Rising from the tubes 30, and arranged in spaced relation with respect to each other longitudinally thereof, are short tubes 41 into which the lower ends of the rods 42 extend, the upper ends of the rods being slidably mounted within the tubes 43 that extend downwardly from the upper longitudinal tubes 27 of the animal clamping members. These rods 42 are of lengths less than the distance between the tubes 27 and 30, so that the rods may be moved upwardly within the short tubes 43 to disengage within the short tubes 41. Sliding collars 44 are so designed that they will move over the short tubes 41 and at the same time extend over the rods 42, securing the rods in position. When it is desired to remove any number of the rods at the forward ends of the animal clamping members, it is only necessary to move the rods upwardly disengaging the short sockets 41, whereupon the rods may be moved laterally and removed from the tubes 43 at the top thereof. This will provide a clearance so that ready access to the upper portion of the body of an animal to be treated, may be had while the animal is being clamped between the clamping members 26.

Extending longitudinally of the movable frame and disposed intermediate the sides thereof, is a shaft 45 to which the arms 46 are secured, the arms 46 being disposed adjacent to the ends of the shaft 45. Links 47 connect the arms 46 with the extended ends of the end tubes of the animal clamping or squeeze members 26. At one end of the shaft 45 is an arm 48 that extends upwardly therefrom, and by means of which the shaft 45 may be rotated to move the upper ends of the animal clamping members or squeeze chute 26 towards or away from each other to clamp an animal therebetween or release the animal, according to the direction of rotation of the shaft. The reference character 49 indicates a chain which has connection with the free end of the arm 48 and is so arranged that it may be positioned over the hook 50 to hold the clamping members of the squeeze chute in clamping relation with each other to clamp the animal therebetween restraining the animal against movement while under treatment.

When it becomes necessary to adjust the initial positions of the side members of the squeeze chute, adapting the squeeze chute for use in clamping or squeezing animals of various sizes, it is only necessary to move the lower ends of the clamping members of the squeeze chute to the desired position, with respect to the end rods of the movable frame. For larger animals, the lower edges of the clamping members of the squeeze chute would be widened or separated greater distances apart, while for smaller animals, the lower edges of the clamping members would be moved closer together as desired. The front end of the chute is closed by means of the removable end gate 51, the end gate embodying a rectangular frame of a size to fit over the open front end of the chute.

At one side of the end gate, are spaced hinge members 52 which are arranged in upper and lower pairs, the hinge members 52 being designed to fit over similar tubular hinge members formed on the upright tubes of the movable frame of the chute, hingedly connecting the end gate, there being pins extended through the hinge members 52 and hinge members of the vertical movable frame.

At the opposite side of the end gate, is a tubular member 53 that fits between spaced tubular members 54 to accommodate the pin 55 which holds the gate in its closed position, closing the front end of the movable frame of the chute. Since the end gate is removable, it is obvious that when the device is to be used as a chute, the end gate will be removed so that animals may pass through the chute into an elevated carrier. When the device is to be used as a restraining device for holding animals against movement while they are being treated, the end gate, of course, will be replaced.

The end gate provides a support for the lower section 56 of the stanchion, which is V-shaped, to receive the neck of an animal. As shown, the lower section is formed with extensions 57 which are formed with tubular members 58 that cooperate with tubular members 59 carried by the removable stanchion section 60, the tubular members accommodating the pins 61 in securing the movable stanchion section 60 in position. This section 60 is, of course, used when larger animals are being held by the stanchion.

The reference character 62 indicates the upper movable arm of the stanchion, and as shown, the arm 62 has one of its ends pivotally connected with the end gate, at 63, there being provided a bolt passing through one end of the arm 62, the bolt also passing through an opening in the plate 64, the openings being formed in the plate so that an adjustment of the arm 62 may be had adapting the arm 62 for use in clamping necks of various sized animals.

Also mounted on the end gate, are vertical parallel spaced rods 65, between which a rod 66 is pivotally mounted at one of its ends, the spring 67 bearing against the rod 66 adjacent to its pivoted end, for normally urging the rod inwardly. Curved fingers 68 extend downwardly from the rod 66 and are adapted to engage over the upper edge of the arm 62 holding the arm in its adjusted position. When it is desired to clamp an animal's neck within the stanchion, the arm 62 is swung downwardly, the arm passing over the fingers 68 to the desired clamping position. To release the arm 62, it is only necessary to press the arm 62 down slightly, whereupon the rod 66 may be swung outwardly against the action of the spring 67.

Secured to the end gate, is a plate 69 which is formed with tubes 70 and 71, the tubes 70 and 71 accommodating the ends of the clamping arms 72. These arms 72 have offset portions 73 adapted to fit over the noses of animals held within the stanchion to hold the head of the animal absolutely rigid for treatment. It will, of course, be understood that either of the arms 72 may be used, according to the size of the head of the animal being treated.

It might be further stated that when the member 53 of the gate is positioned between the spaced tubular members 54, the tubular member 53 is forced against the outer end of the coiled spring 74 held within the tubular housing 75, the coiled spring 74 extending an appreciable distance between the members 54 in the path of travel of the member 53. This spring acts as a means to cushion the movements of the gate when the gate is swung to its closed position, so that the locking pin 55 will be centered directly over the tubular member 53 to move thereinto.

The reference character 76 indicates the hitch which embodies tubular members that have their rear ends positioned in the tubular members 77, where they are secured thereto by means of the pins 78 dropped through registering openings in the members 77 and side tubes of the hitch.

From the foregoing, it will be seen that I have provided a combined loading chute and restraining device which may be readily and easily converted from a loading chute into a restraining device, or vice versa.

What is claimed is:

1. An animal restraining device comprising a main frame, pivoted animal clamping members mounted within the main frame, a stanchion mounted at the forward end of the main frame, an outer movable arm forming a part of the stanchion movable to clamp the neck of an animal, a swinging rod mounted at the forward end of the main frame adjacent to the movable arm, downwardly curved fingers mounted on the rod, said fingers being arranged in vertical spaced relation with each other, said fingers engaging said upper movable arm of the stanchion, holding the arm in its clamping position, and means for moving the animal clamping members into engagement with the sides of the animal.

2. An animal restraining device comprising a stationary main frame, a pair of substantially vertical pivoted animal clamping members, mounted within the main frame, a stanchion at the forward end of the main frame, pivoted clamping arms movable in horizontal planes, mounted at the forward end of the main frame, said clamping arms having offset portions for clamping the nose of an animal preventing movement of the animal's head, and means for moving the animal clamping members into engagement with the sides of the animal, holding the animal within the frame.

LAURANCE E. HELDENBRAND.

REFERENCES CITED

The following references are of record in the file of this patent:

UNITED STATES PATENTS

| Number | Name | Date |
|---|---|---|
| 470,388 | Avery | Mar. 8, 1892 |
| 502,829 | Phillips | Aug. 8, 1893 |
| 815,898 | Arthur | Mar. 20, 1906 |
| 1,171,878 | Pierce | Feb. 15, 1916 |
| 1,227,712 | Watson | May 29, 1917 |
| 1,510,832 | Codworth | Oct. 7, 1924 |
| 1,525,366 | Brown | Feb. 3, 1925 |
| 1,764,522 | Primm | June 17, 1930 |
| 2,229,588 | Parker | Jan. 21, 1941 |
| 2,438,322 | McDonough | Mar. 23, 1948 |
| 2,522,170 | Fuller | Sept. 12, 1950 |